United States Patent [19]

Sheratte

[11] 4,154,919
[45] May 15, 1979

[54] LINEAR AND CROSS-LINKED POLYBENZIMIDAZOLES

[75] Inventor: Martin B. Sheratte, Canoga Park, Calif.

[73] Assignee: Acurex Corporation, Mountain View, Calif.

[21] Appl. No.: 719,264

[22] Filed: Aug. 31, 1976

[51] Int. Cl.² .................. C08G 73/06; C08G 73/18
[52] U.S. Cl. ..................... 528/186; 260/32.6 NT;
    260/33.4 P; 427/407 R; 428/290; 528/128;
    528/142; 528/145; 528/172; 528/173; 528/174;
    528/176; 528/184; 528/211; 528/220; 528/310;
    528/327; 528/341; 528/342; 528/353
[58] Field of Search ............ 260/47 CP, 78.41, 2 R,
    260/78 SF; 528/172, 173, 220, 174, 342, 176,
    363, 184, 370, 391, 341, 417, 353, 422, 423, 128,
    186

[56] References Cited

U.S. PATENT DOCUMENTS

| Re. 26,065 | 7/1966 | Marvel et al. | 260/47 CP |
|---|---|---|---|
| 3,386,969 | 6/1968 | Levine | 260/78.41 |
| 3,414,543 | 12/1968 | Paufler | 260/78.41 |
| 3,471,453 | 10/1969 | Rabilloud et al. | 260/78.41 |
| 3,546,166 | 12/1970 | Rabilloud et al. | 260/78.41 |
| 3,549,594 | 12/1970 | Twilley et al. | 260/78.41 |
| 3,574,170 | 4/1971 | Chevevey | 260/78.41 |
| 3,597,391 | 8/1971 | Hara et al. | 260/78.41 |
| 3,708,439 | 1/1973 | Sayigh et al. | 260/78.41 |

OTHER PUBLICATIONS

"Polymers from O-Aromatic Tetramines & Aromatic Dianhydride", J. Poly. Sci. PTA, vol. 3, pp. 3549-3571 (1965), Dawans et al.

"Polybenzoylenebenzimidazoles", J. Poly Sci. PTA-1, vol. 4, pp. 59-70 (1966), Colson et al.

*Primary Examiner*—Herbert J. Lilling
*Attorney, Agent, or Firm*—Flehr, Hohbach, Test, Albritton & Herbert

[57] ABSTRACT

A polybenzimidazole having a polymer chain with the following repeating unit:

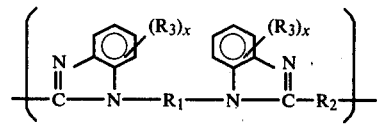

$R_2$ is a divalent carbon ring with the linkage to an adjacent repeating unit through adjacent carbon atoms of the ring. Such polybenzimidazoles are formed by the condensation of (a) a substitute carbon ring compound, having at least one dicarboxylic anhydride or its equivalent substituted at adjacent carbon atoms and (b) an organic tetraamine of the following formula:

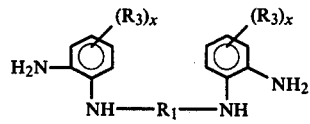

Polybenzimidazoles of the foregoing type may be formed by the use of a tetracarboxylic dianhydride in the condensation reaction. These cross-linked polymers are characterized by minimal softening or burning at high temperature.

14 Claims, No Drawings

LINEAR AND CROSS-LINKED POLYBENZIMIDAZOLES

BACKGROUND OF THE INVENTION

The present invention relates to a novel linear and cross-linked polybenzimidazole formed by the condensation of certain polyamines and anhydrides and to their method of preparation and use.

For several years, the thermal and oxidative stability of polymers containing aromatic structures have been recognized and a variety of polymers have been synthesized in which aromatic rings are linked together or combined with aliphatic segments in chains or networks. The synthesis of a variety of polybenzimidazoles has been previously reported. (Encyclopedia of Polymer Science and Technology, Vol. II, pages 188 to 228).

The more familiar polybenzimidazoles are obtained from bis aromatic ortho tetraamines and aromatic diacids or their derivatives by either a melt condensation or reaction in solvent at temperatures generally above 200° C. The condensation of an unsubstituted aromatic ortho diamine with a cyclic anhydride of a diacid however does not provide the benzimidazole as a single product. The products obtained are shown below by example with model compounds. (F. Dawans and C. S. Marvel, "Polymers from ortho Aromatic Tetraamines and Aromatic Dianhydrides", Journal of Polymer Science: Part A, Vol. 3, pp. 3549-3571 (1965).

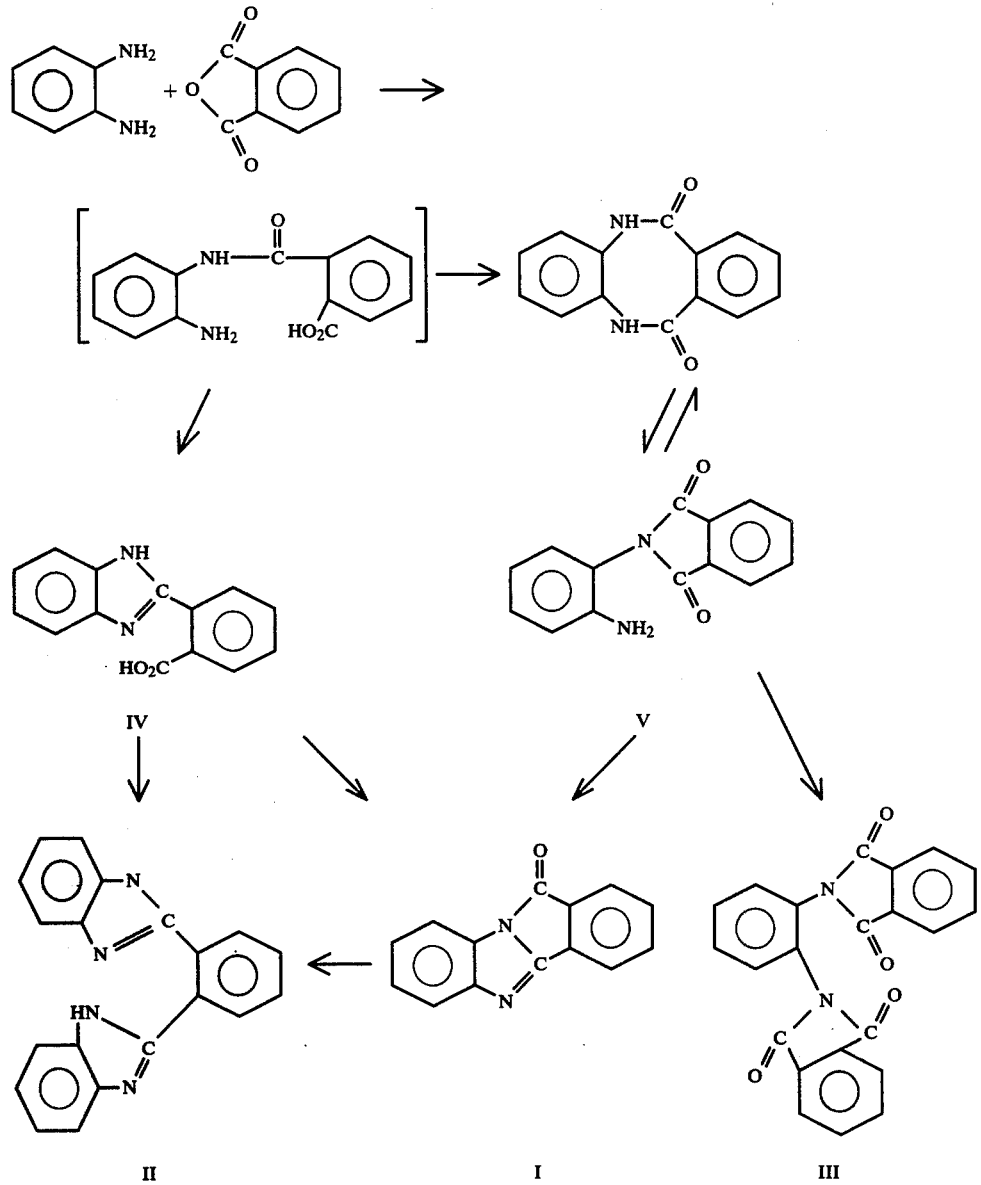

Accordingly, benzimidazole polymers of sufficient molecular weight as to be useful are difficult to obtain with these reactants. Even though the reaction of phthalic anhydride with 3,3',4,4'-tetraaminebiphenyl to provide a linear polybenzimidazole is reported in U.S. Pat. No. Re. 26,065 (3,174,974), it is evident from the publications described below that some portion of the phthalic anhydride was consumed as a chain terminating agent and was not used to propogate the molecular weight growth of the polymer.

In addition, a new polymer is obtained from dianhydrides and tetraamines if a precise heating schedule is employed. The above Dawans and Marvel work describes a high molecular weight polybenzoylenebenzimidazole from pyromellitic dianhydride and 3,3',4,4'-tetraaminobiphenyl. Careful slow heating of the reactants to temperatures of 300° C. to 350° C. is required. If heating is too rapid, a cross-linked polybenzimidazole structure is obtained. The two polymers which can be obtained require different stoichiometries of reactants to proceed to high molecular weight. This is illustrated below:

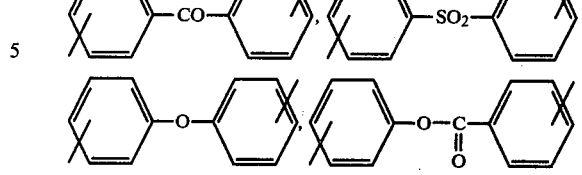

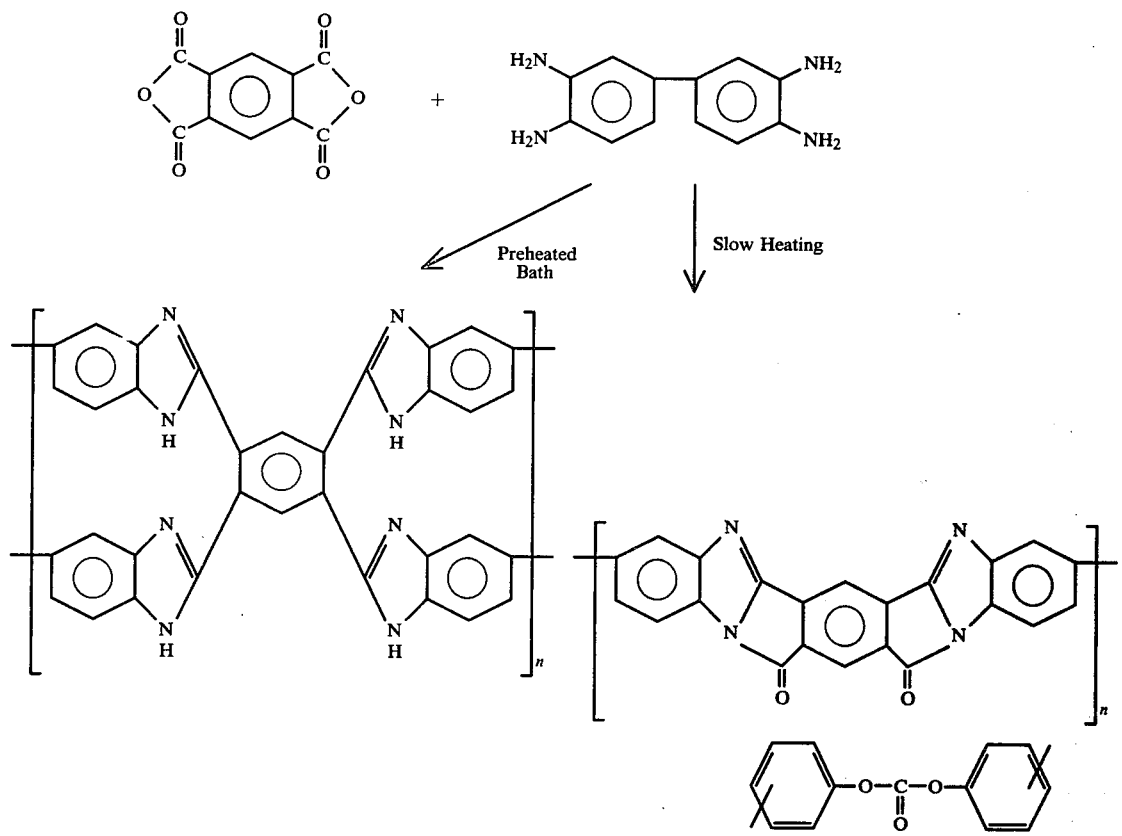

Colson, Michel, and Paufler further elucidated the intermediates formed in the polymerization of ortho diamines with dianhydrides. (J. G. Colson, R. H. Michel, and R. M. Paufler, "Polybenzoylenebenzimidazoles", *Journal of Polymer Science: Part A*-1, Vol. 4, 59–70 (1966).

U.S. Pat. No. 3,708,439 describes polybenzimidazoles with the following structure:

where $R_1$ is aromatic and $R_2$ is described as being formed from diphenyl esters of diacids, wherein $R_2$ is arylene ($C_{6-12}$), alkylene ($C_{1-12}$), cycloalkylene ($C_{5-8}$), or In all instances, only the m or p substituted acids are described. Thus, the patent excludes reference to condensation with the inexpensive common diacid derivative, phthalic anhydride. This is possibly because of the foregoing disclosure in Dawans et al. that phthalic acid does not form useful polymers with certain diamines.

SUMMARY OF THE INVENTION AND OBJECTS

The present invention comprises linear or cross-linked polybenzimidazoles having a polymer chain with a repeating unit represented by the following formula:

(1)

wherein $R_1$ is a divalent moiety selected from the group consisting of (a) an arylene having from 6 to 12 carbon atoms, and (b) an alkylene having from 1 to 12 carbon atoms, inclusive, (c) a cycloalkylene having from 5 to 8 carbon atoms, inclusive.

$R_2$ is a divalent carbon ring moiety with the linkage to an adjacent repeating unit through adjacent carbon atoms of said ring, said ring moiety being selected from the group consisting of an arylene having from 6 to 12 carbon atoms and a cycloalkylene having from 5 to 8 carbon atoms, and $R_3$ is selected from the class of lower-alkyl, lower-alkoxy, and halo, x is an integer from 0 to 4.

The foregoing polybenzimidazole is readily cross-linked to a bridge connecting the $R_2$ moieties derived from a dianhydride or its equivalent. In general, the foregoing polybenzimidazoles are formed by the condensation of (a) a substitute carbon ring compound having at least one dicarboxylic anhydride or its equivalent substituted at adjacent carbon atoms, and (b) an organic tetraamine of the following formula:

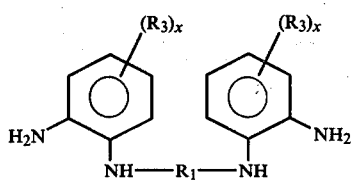

wherein $R_1$ is the same divalent moiety as set forth in formula (1).

The polybenzimidazoles of formula (1) are relatively inexpensive because they are formed by the condensation of low cost phthalic anhydride. By inclusion of a dianhydride, the present polybenzimidazoles may be cross-linked which provides linkages between the $R_2$ units of adjacent chains. Either the linear or cross-linked polymers are relatively easy to process and have exceptional thermal stability.

DETAILED DESCRIPTION OF THE PREFERRED EMBODIMENTS

The following definitions are applicable to the respective terms used herein with the following limitation. The symbol $R_2$ of formula (1) is defined to require linkage of the arylene or cycloalkylene through adjacent carbon atoms.

The term "arylene from 6 to 12 carbon atoms, inclusive", means the divalent radical obtained by removing a hydrogen atom from each of the two nuclear carbon atoms in an aromatic hydrocarbon having the stated carbon atom content.

The term "alkylene from 1 to 12 carbon atoms, inclusive", has its generally accepted meaning and is inclusive of methylene, ethylene, hexylene, and isomeric forms thereof.

The term "cycloalkylene from 5 to 8 carbon atoms, inclusive", means the divalent radical obtained by removing two hydrogen atoms from the same or different ring carbon atoms in a cycloalkane having the stated carbon atom content. Said cycloalkylene is inclusive of cyclopentylene, cyclohexylene, cycloheptylene, cyclooctylene and isomeric forms thereof.

The term "lower-alkyl" means alkyl from 1 to 6 carbon atoms, inclusive, such as methyl, ethyl, propyl, butyl, pentyl, hexyl, and isomeric forms thereof.

The term "lower-alkoxy" means alkoxy from 1 to 6 carbon atoms, inclusive, such as methoxy, ethoxy, propoxy, butoxy, pentoxy, hexoxy and isomeric forms thereof.

The term "halo" means fluoro, chloro, bromo, and iodo. The letter "S" in the rings indicates full saturation.

As set forth above, the polybenzimidazoles of the present invention summarized as formula (1) obtained by the condensation of anhydrides and dianhydrides with the bis ortho-diamines of formula (2). Such amines are referred to hereinafter by the short form "tetraamine". Conventional techniques may be employed to produce the polybenzimidazoles such as melt or solution condensation. See, e.g., the general techniques described in U.S. Pat. No. Re. 26,065.

The dicarboxylic acid component employed in the condensation reaction includes a substituted carbon ring compound having at least one dicarboxylic anhydride substituted at adjacent carbon atoms. In one embodiment, such ring compound is selected from the group consisting of an arylene having from 6 to 12 carbon atoms, preferably phthalic anhydride. Here, the carbons are substituted at the ortho position on the arylene group. In another embodiment, the ring compound comprises a cycloalkylene having from 5 to 8 carbon atoms, also with a dicarboxylic anhydride with substitutions at adjacent carbon atoms.

The substituted carbon ring compound may either be of the type comprising a dicarboxylic anhydride substituted at adjacent carbon atoms, or its equivalent. The term "equivalent" refers to other forms or derivatives of the anhydride which function in the manner of the anhydride to form the polybenzimidazole of formula (1). Thus, for example, the term includes the diacids substituted on adjacent carbon atoms in the non-anhydride form. Furthermore, it includes the corresponding diphenyl esters which would form the anhydride upon hydrolysis and subsequent dehydration of the resulting diacid. Similarly, it includes the diacid chlorides which also are capable of forming the anhydrides under the same conditions. However, it should be understood that the preferred form is the anhydride because of its low cost, lack of noxious by-products, such as phenol during condensation, and the elimination of the requirement to purify the polymer from condensation by-products.

Certain of the specified dicarboxylic acid reactants, e.g., the phenyl esters, can be condensed in a melt at elevated temperatures to produce the polymers. Where the anhydride is employed with the tetraamine, it is preferable to use solvents such as dimethylformamide, dimethylacetamide or m-cresol. Such solvents are useful in preparing varnishes of the partially condensed reactants to form soluble prepolymers which are useful for impregnating glass fibers, fabrics, or other fibers which can be subsequently processed into laminates or other useful objects. The initial condensation of the anhydrides with the tetraamines to form the prepolymers occurs at approximately room temperature whereas the temperature required to complete polymerization to form the final benzimidazole polymers are generally above 200° C., usually 300° C. and may be as high as 400° C. or more.

The foregoing solvated prepolymers are particularly useful for impregnating various substrates for use in the manufacture of high temperature laminates and alblative materials. Suitable substrates include glass, carbon, graphite, boron, boron nitride, or quartz in various forms such as fibers of fabrics. Also, the prepolymer may be polymerized with a suitable filler, e.g., asbestos for use as an ablative material. The cross-linked polymers are particularly useful in high thermal flux environments to provide non-softening and non-burning behavior.

As set forth above, it is advantageous from an economic standpoint to employ the anhydrides, specifically inexpensive phthalic anhydride, to form the polybenzimidazole of formula (1).

Another major advantage is that the linkages at $R_2$ occurs through adjacent carbon atoms of the ring. This permits the ready cross-linking between linear chains of the repeating units through a bridge interconnecting the $R_2$ moities. In a particularly preferred embodiment, such bridges are formed directly between the $R_2$ moities derived from a dianhydride or its equivalent (as defined above). For example, the following cross-linked polymer may be formed by the condensation of 3,3'4,4'-benzophenonetetracarboxylic dianhydride, phthalic anhydride and N,N' (o-aminophenyl)-4,4'diaminobiphenyl, wherein x and y can be varied to increase (or decrease) the cross-linked density as desired.

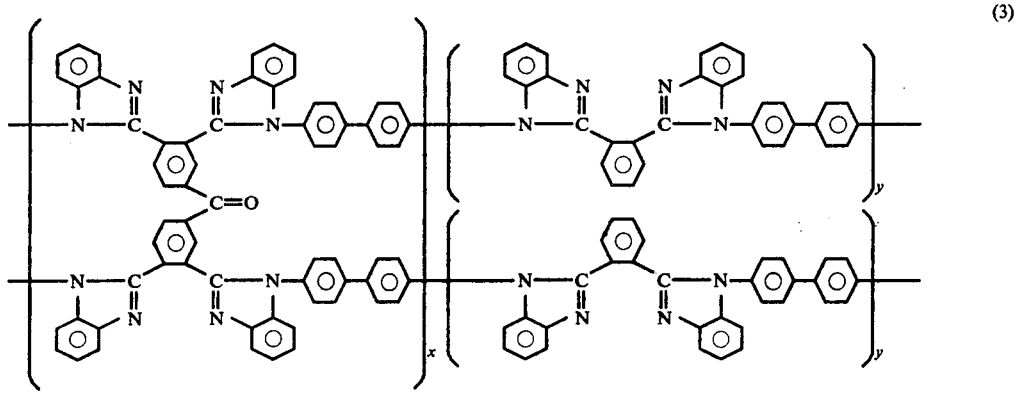

(3)

Suitable dianhydrides for use in the present invention are as follows.

TABLE 1

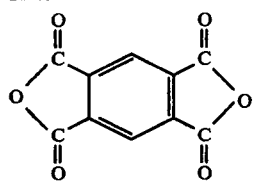

pyromellitic dianhydride

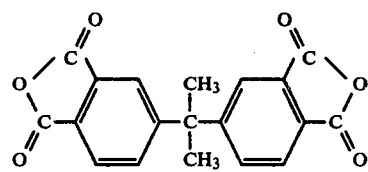

2,2-bis(3,4-dicarboxyphenyl)propane dianhydride

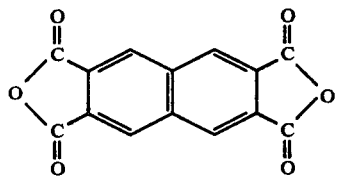

2,3,6,7-naphthalenetetracarboxylic dianhydride

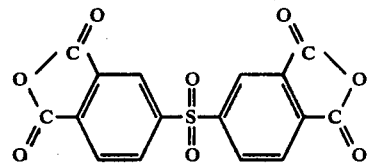

bis (3,4-dicarboxyphenyl)sulfone dianhydride

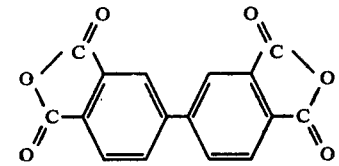

3,3',4,4'-biphenyltetracarboxylic dianhydride

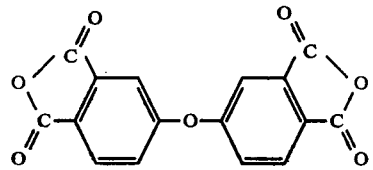

bis(3,4-dicarboxyphenyl) ether dianhydride

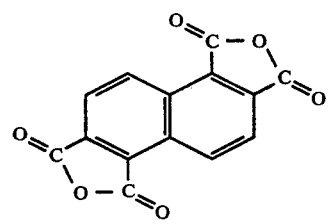

1,2,5,6-naphthalenetetracarboxylic dianhydride

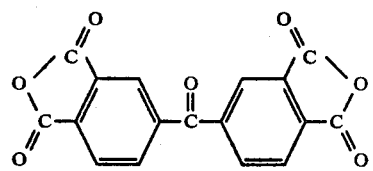

3,4,3',4'-benzophenonetetracarboxylic dianhydride

TABLE 1-continued

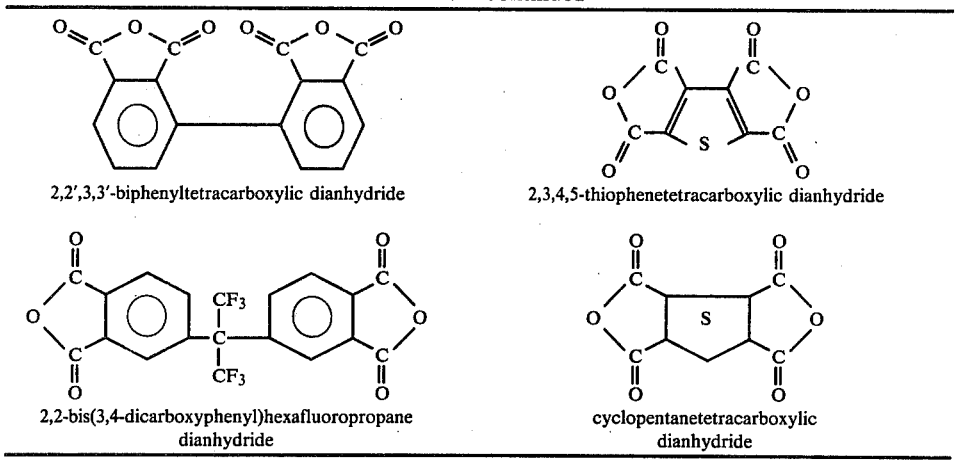

| 2,2',3,3'-biphenyltetracarboxylic dianhydride | 2,3,4,5-thiophenetetracarboxylic dianhydride |
| --- | --- |
| 2,2-bis(3,4-dicarboxyphenyl)hexafluoropropane dianhydride | cyclopentanetetracarboxylic dianhydride |

The foregoing cross-linked polybenzimidazole is to be contrasted with the linear polybenzimidazole of the present invention formed by the condensation of the anhydride in the absence of the dianhydride. An example of linear polymer comprises phthalic anhydride and N,N'-bis (2-aminophenyl)-4,4' diamino-diphenyl. The polymer formed from this reaction includes the following repeating unit.

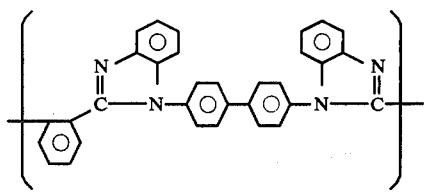

(4)

In accordance with the present invention, mixtures of carbon ring compounds and of organic tetraamines of the foregoing type may be employed so long as they form polybenzimidazole of the repeating unit of formula (1). For example, such linear polymers and copolymers may be formed of phthalic, tetrahydrophthalic, tetrachlorophthalic anhydrides or mixtures thereof.

In the condensation reactions to form either the cross-linked polymer or the linear polymer of the present invention (e.g., formulas (3) or (4)), water is the only volatile by-product released. Unlike prior art condensation reactions which require the use of various phenyl esters, phenol is not released unless a phenyl ester such as diphenyl phthalate is added for some processing benefit.

Referring again to the cross-linked polymer of the present invention, the tetracarboxylic dianhydride cross-linking agent is added to the reacting monomer mixture. The cross-linking dianhydride reactant can also be used along to react with the tetraamine to form a fully cross-linked product, or it can be used in combination with a dicarboxylic anhydride in varying amounts relative to the monoanhydride. Typically, from 0.5 to 2.5 mole percent to as high as 100 mole percent of the cross-linking agent is used based on the total anhydride content.

A further disclosure of the nature of the present invention is provided by the following specific examples of the practice of the invention. It should be understood that the data disclosed serve only as examples and are not intended to limit the scope of the invention.

EXAMPLE 1

4,4'bis(o-aminoanilino)biphenyl 4,4'-Dibromobiphenyl (156 g., 0.5 mole) was condensed with o-nitroaniline (138 g., 1.0 mole) using cuprous iodide catalyst and anhydrous sodium carbonate as an acid acceptor in refluxing nitrobenzene (500 ml) during 16 hours. The resulting 4,4'-bis-(o-nitroanilino) biphenyl, obtained in 85% yield, was reduced with sodium sulfide in ethylene glycol at 150° to 200° C. The yield of 4,4'-bis(o-aminoanilino)biphenyl was 132 g. (72% yield, mp 211°-222° C.). The melting behavior of the compound is unusual. Differential Scanning Calorimetry (DSC) analysis provides two endotherms; one at 211° C. and one at 222° C. Depending on the thermal history of the amine, either melting point (or combination) is observed. The amine assay by acetylation was 16.2, theory 16.93. The elemental analysis provided the following:

| | % C | % H | % N | % O | % Ash |
| --- | --- | --- | --- | --- | --- |
| Calculated for $C_{24}H_{22}N_9$ | 78.66 | 6.05 | 15.29 | 0.00 | 0.00 |
| Found: | 78.67 | 6.15 | 15.15 | 0.00 | 0.00 |

EXAMPLE 2

1,4-bis(o-aminoanilino)benzene 2-nitroaniline (55.4 g., 0.4 mole) was reacted with 1,4-dibromobenzene (47.2 g., 0.2 mole) in nitrobenzene (500 ml) in the presence of 0.4 g. cuprous iodide with sodium carbonate as an acid acceptor (48.0 g., 0.45 mole) at reflux temperature for 30 hours. The yellow suspension gradually became a deep red. The solvent was removed by steam distillation, yielding a dark granular product which was filtered, washed with hot chloroform (250 ml) and dried. Yield, 40.0 g. (57%), mp 244.5°-246° C.

| | % C | % H | % N |
| --- | --- | --- | --- |
| Calculated for $C_{18}H_{14}O_4N_4$: | 61.71 | 4.03 | 15.99 |
| Found: | 61.46 | 4.20 | 15.75 |

Anhydrous hydrazine (120 ml) was added dropwise during 1 hour to a stirred refluxing suspension of 1,4-bis-(o-nitroanilino)benzene (21.0 g., 0.006 mole) in methanol (1.5l) containing approximately 0.01 g. of Raney nickel. After complete hydrazine addition, the yellowish-brown reaction mixture was refluxed for 2 hours, treated with charcoal, and filtered. Concentration of the clear light brown filtrate to about 800 ml., followed by cooling, gave 13.1 g. (45% overall yield) of 1,4-bis(o-aminoanilino)benzene as near white crystals melting at 161.5°–162.0° C. and having the following elemental analysis:

|  | % C | % H | % N |
|---|---|---|---|
| Calculated for $C_{18}H_{10}N_4$: | 74.45 | 6.25 | 19.30 |
| Found: | 74.68 | 6.40 | 19.21 |

EXAMPLE 3

Polybenzimidazole formed from the condensation of 4,4'-bis(o-aminoanilino)biphenyl with phthalic anhydride In a polymerization tube under nitrogen 4,4'-bis-(o-aminoanilino)biphenyl (0.01 mole, 3.665 g.) was dissolved in ~10 ml. of phenol. The tube was introduced into a pre-heated oil bath at 170° C. and phthalic anhydride (0.01 mole, 1.481 g.) was added. The homogeneous solution was heated to 250° C. during 4 hours with gentle evolution of phenol. At this time, there remained a clear, amber viscous melt. After 1 hour at 250° C., pump vacuum was applied for 10 minutes. The resulting foamed prepolymer was tough with an $\eta_{inh}$ of 0.26 (0.5%, m-cresol). The prepolymer was further cured for 1 hour at 400° C. ($N_2$). During this thermal treatment, the polymer fused, foamed and resolidified within a few minutes. After cooling, the foamed mass was extremely tough and resisted pulverizing in a mortar. A weight loss of 8.3% was recorded during this cure and the $\eta_{inh}$ of the products was 0.79 (0.5% in m-cresol at 25.0° C.).

A similar polymerization in phenol using 4,4'-bis-(o-aminoanilino)biphenyl and phthalic anhydride after heating to 310° C. gave a greenish-brown polymer, totally sulfuric acid soluble, with an inherent viscosity of 1.58 (0.5%, $H_2SO_4$). The final polymer obtained after heating at 400° C. for 1 hour was a deep brown. An elemental analysis of this polymer is shown below:

|  | % C | % H | % N | % O |
|---|---|---|---|---|
| Calculated for $C_{32}H_{20}N_4$: | 83.46 | 4.38 | 12.16 | 0.00 |
| Found: | 83.54 | 4.47 | 12.04 | 0.00 |

EXAMPLE 4

Film forming properties of Example 3 polymer

Phthalic anhydride (0.03 mole) was dissolved in hot phenol (10 g.) and the solution allowed to cool. 4,4'-bis-(o-aminoanilino)biphenyl (0.03 mole) was then intimately mixed in, and the mixture well flushed with nitrogen. The vessel was immersed in an oil bath at 180° C. for 1 hour under a stream of nitrogen. At the end of this time, most of the phenol had boiled out and a prepolymer with inherent viscosity 0.25 (0.5%, $H_2SO_4$) was obtained. This was crushed, and advanced at 300° C. for 2 hours and 400° C. for 1 hour under nitrogen. The pale cream colored polymer so obtained had inherent viscosity 1.8 (0.5%, $H_2SO_4$), and was fully soluble in m-cresol, from which a colorless tough transparent film was cast. This film lost less than 20% of its weight after 24 hours exposure to air at 700° F.

EXAMPLE 5

Diphenyl ester condensation

In a polymerization tube under nitrogen 4,4'-bis (o-aminoanilino)biphenyl (0.01 mole, 3.665 g.) and diphenyl phthalate (0.01 mole, 3.18 g.) were introduced. The tube was placed in a 250° C. bath and after 1 hour, vacuum applied. The usual foaming occurred and the temperature gradually raised over an 8 hour period to provide tough (high molecular weight) polybenzimidazole.

EXAMPLE 6

Time-temperatures required to obtain high molecular weight 7.32 g. (0.02 mole) tetraamine was melted under nitrogen with 5 g. of phenol at 150°–170° C. The homogeneous melt was cooled and 2.96 g. (0.02 mole) phthalic anhydride added. The mixture was then heated at 215° C. for 1 hour, thus removing the phenol and initiating the polymerization. The properties of the polymer at various stages were as follows:

|  | $\eta_{inh}$ | mp |
|---|---|---|
| 1 hour at 215° C. |  |  |
| +1 hour at 250° C. | 0.33 | ω 300° C. |
| +1 hour at 270° C. | 0.64 | > 400° C. |
| +5 hours at 290° C. | 1.19 | Very high |
| +3 hours at 400° C. | Insoluble, infusible | Fully cured material |

The fully cured material showed less than 1% weight loss after 230 hours at 600° F. in air.

The same procedure as shown above was repeated except that the reaction at 250° C. before the polymer was finally cured, was conducted for a longer period of time (~16 hours). Inherent viscosities of the polymer were as follows: after 1 hour at 250° C. and 1 hour at 400° C., 0.33 and 1.14 respectively; after 16 hours at 250° C. and 1 hour at 400° C., 1.14 and 3.25 respectively. The viscosities shown above were all measured at 0.5% in $H_2SO_4$ at 25° C.

EXAMPLE 7

Polybenzimidazole formed from the condensation of 1,4-bis(o-aminoanilino) benzene and phthalic anhydride A polymerization tube containing an intimate mixture of 1,4-bis(o-aminoanilino)benzene (1.452 g., 0.005 mole), phthalic anhydride (0.741 g., 0.005 mole), and phenol (12.5 g.) under nitrogen was introduced into a preheated oil bath at 170° C. to form a clear orange melt. The temperature was maintained at 165° C.–170° C. for 16 hours, then the volatiles were removed under pump vacuum. The resulting pinkish-purple prepolymer exhibited a melt temperature of 295° C., $\eta_{inh}$ of 0.20 (0.5%, $H_2SO_4$), $\lambda_{max}$ of 290 mμ, and $K_{sp}$ of 21,800. The prepolymer was advanced under nitrogen by introducing into an oil bath at 350° C. and maintained at 350° C. for 2 hours. The pinkish-orange polymer exhibited an $\eta_{inh}$ of 0.40 (0.5%, $H_2SO_4$), $\lambda_{max}$ of 296 mμ, ε of 27,100 and the following elemental analysis:

|  | % C | % H | % N |
|---|---|---|---|
| Calculated for $C_{26}H_{16}N_4$: | 81.23 | 4.20 | 14.57 |
| Found: | 81.04 | 4.27 | 14.70 |

EXAMPLE 8

Polybenzimidazole formed from the condensation of N,N'-bis(o-anilino)-1,6-hexanediamine and diphenyl phthalate A polymer was prepared by melt condensation of N,N'-bis(o-anilino)-1,6-hexanediamine with diphenyl phthalate. The N,N'-bis(o-anilino)-1,6-hexanediamine with 0.2 moles of ortho-fluoronitro benzene in 100 ml of water at room temperature followed by stirring at 50° C. for three hours. On subsequent cooling to room temperature, the orange melt solidified to an orange-yellow solid, which was isolated, dissolved in ethylene glycol, and reduced at 120° C. with sodium sulfide. The N,N'-bis(o-anilino)-1,6-hexanediamine was crystallized from aqueous methanol and had a melting point of 162° C. 0.04 moles of this material was then polymerized with 0.04 moles of diphenyl phthalate at 210° C. for four hours under nitrogen. The resultant prepolymer had a melting point of 110°-130° C. with an inherent viscosity of 0.1 (0.5%, $H_2SO_4$). After advancement at 300° C. for six hours, the polymer melted at 210°-230° C. and had an inherent viscosity of 0.38 (0.5%, $H_2SO_4$). Further advancement at 340° C. for eighteen hours led to an inherent viscosity of 0.65 (0.5%, $H_2SO_4$) with a melting range of 300°-320° C.

EXAMPLE 9

Preparation of amine terminated prepolymers and their subsequent cross-linking with dianhydrides 7.32 g. (0.02 mole) 4,4'-bis(o-aminoanilino) biphenyl and 2.66 g. (0.018 mole) of phthalic anhydride were heated together as previously described for 3 hours at 250° C. followed by 24 hours at 350° C. During the last 10 hours of this period there was no weight loss. The resulting amine terminated prepolymer had $\eta_{inh}$ = 0.31 (0.5%, $H_2SO_4$) and was completely soluble in N,N-dimethylformamide.

The above experiment was repeated, using 7.32 g. (0.02 mole) of the amine and 2.369 g. (0.016 mole) of phthalic anhydride. The so-formed prepolymer had $\eta_{inh}$ = 0.18 (0.5%, $H_2SO_4$) and mp 280°-300° C. As soon as it had been isolated, about 1 g. was mixed with the calculated stoichiometric amount of pyromellitic dianhydride and heated under nitrogen at 400° C. for 16 hours. Another 1 g. sample was mixed with the calculated stoichiometric amount of benzophenone tetracarboxylic dianhydride (BTDA) and heated at 400° C. for 16 hours.

At the end of this time, the pyromellitic dianhydride cross-linked material was still fusible and easily crushed between the fingers. On the other hand, the BTDA material was hard, almost impossible to crush in a pestle and mortar, and completely infusible. When heated in a Bunsen flame it formed a very dense strong char. Under isothermal weight loss conditions in air at 800° F., it lost 2.2% in 6 hours, 4.0% in 10 hours, 24% in 24 hours, 39% in 30 hours, and 82% in 46 hours.

EXAMPLE 10

Prepolymer Preparation

Phthalic anhydride (2.0 mole, 0.65 lb) and 3,3',4,4'-benzophenone-tetracarboxylic dianhydride (0.5 mole, 0.31 lb) were dissolved under nitrogen in N,N-dimethylformamide (0.35 ml, 2.28 lb) to form a clear light yellow solution. 4,4'-bis(o-aminoanilino) biphenyl (3.0 mole, 2.42 lb) was added to the stirred anhydride solution at such a rate as to maintain the temperature at less than 60° C. The reaction solution acquired an immediate dark orange-brown color. After the complete addition of the amine, the resulting viscous dark solution was stirred at ambient temperature for 0.5 hour. The prepolymer solution was then heated to and stirred at 100° C. for 0.5 hour, followed by stirring at ambient temperature for 1 to 2 hours.

The resulting prepolymer solution contained 60% solids and was used directly in prepreg preparation.

EXAMPLE 11

Investigation of prepreg drying cycles

A study was conducted to determine the temperature required to effect solvent removal from a prepreg prepared by a single coat of prepolymer solution containing 46.3% solids in N,N-dimethylformamide. This information is given in the table below:

TABLE 2

| | PREPREG DRYING | | | |
|---|---|---|---|---|
| Drying Condition | Resin Pickup, % | Remaining Solvent Volatiles, % | Remaining Total Volatiles, % | Prepreg Flow* |
| 3 hr. at 280° F. | 44.2 | 0.08 | 3.7 | Excessive |
| 2 hr. at 315° F. | 45.4 | 0.13 | 4.6 | Excessive |
| 1 hr. at 350° F. | 44.7 | 0.0 | 4.2 | Good |
| 10 min. at 400° F. | 44.2 | 0.0 | 3.7 | Good |

*Determined at 400° F.

The results of this prepreg drying study indicates that the solvent can be effectively removed under commercially acceptable conditions.

EXAMPLE 12

Prepolymer Characterization

Prepolymer solutions (28.2% solids) were prepared in N,N-dimethylformamide, N,N-dimethylacetamide, and m-cresol by adding an intimate mixture of the anhydrides to the tetraamine in the respective solvent. These prepolymer solutions were used directly in application work. Essentially, no change in the viscosity of the prepolymer solutions was observed after 11 days. After 19 days, however, the viscosity of the N,N-dimethylformamide solution increased slightly, while that of the m-cresol solution decreased slightly. Prepolymers were isolated from each of the solutions and characterized as shown in Table 3 by inherent viscosity (0.5% in $H_2SO_4$ at 25° C.), polymer melt temperature, and infrared and ultraviolet spectroscopy.

Table 3

| | Characterization of Polybenzimidazole Prepolymer | | |
|---|---|---|---|
| Solvent | DMF* | DMAC** | m-cresol |
| $\eta_{inh}$ | 0.08 | 0.09 | Insoluble |
| Melt Temperature, °C. | 181–183 | 181–183 | 215–217 |
| $\lambda_{max}(\epsilon)$*** | 254 (39,000) | 252 (38,000) | Insoluble |

*DMF = N,N-dimethylformamide
**DMAC = N,N-dimethylacetamide
***max = wavelength in m$\mu$, $\epsilon$ = specific absorbance 1 mg/100 ml $H_2SO_4$.

Each of the isolated prepolymers was advanced to final polymer by heating it in an inert atmosphere from 250° C. to 400° C. during 2.5 hours and maintaining a temperature of 400° C. for 1 hour. The total weight loss (8.0%) during the cure was essentially the same for the three polymers. The resulting red polymers appeared to be essentially identical, as evidenced by their infrared spectra and polymer decomposition temperatures of 590° C. in helium. Isothermal aging at 60—° F. in air on polymer samples (particle size pass 30 mesh) exhibited weight losses of 3.6% and 7.3% after 100 and 210 hours, respectively.

EXAMPLE 13

Seven-ply polybenzimidazole laminate data

Seven-ply laminates were fabricated from the prepolymers described in Example 12. The flexural strengths and moduli are given in the table below:

The tests summarized in Table 4 were carried out with the following reagents using the indicated conditions:

Prepreg:
Solution-coated using N,N-dimethylformamide, N,N-dimethylacetamide, and m-cresol as indicated; 3 coats, each dried 15 minutes at 200° F. between coats, then 16 hours at 160° F. and 15 minutes at 200° F. under vacuum.

Carrier:
1581 HTS (994)

Cure Cycle:
3 minutes contact time at 400° F., then 100 psi for 0.5 hour at 400° F., 1 hour at 450° F., 0.5 hour each at 550° F., 650° F., and 750° F., m-cresol only 30-second contact time.

Postcure:
24 hour each at 350° F., 400° F., 450° F., 500° F., then 2 hours at 550° F., 600° F., 650° F., and 700° F., plus 4 hours at 750° F. all in argon.

Resin Content: 25.9 for N,N-dimethylformamide, 24.6% for N,N-dimethylacetamide, and 35.2% for m-cresol; determined by burnout.

Laminate Dimensions: 4 inches × 4.5 inches × 7 plies

Table 4

| Laminate No. | Solvent | Mils/Ply | Room Temperature Flexural Properties | | 600° F. Flexural Properties | |
|---|---|---|---|---|---|---|
| | | | Strength psi × 10³ | Modulus psi × 10⁶ | Strength psi × 10³ | Modulus psi × 10⁶ |
| 1 | DMAC* | 8.6 | 84.4 | 4.19 | 73.1 | 3.63 |
| | | | 68.9 | 4.10 | 75.0 | 3.74 |
| | | | 104.6 | 4.11 | 67.1 | 3.57 |
| 2 | DMF** | 9.3 | 86.0 | 4.13 | 71.7 | 3.65 |
| | | | 96.4 | 3.79 | 65.1 | 3.21 |
| | | | 97.6 | 3.69 | 65.1 | 3.06 |
| | | | 103.4 | 3.92 | 67.0 | 3.07 |
| 3 | m-cresol | 10.7 | 99.1 | 3.8 | 65.7 | 3.07 |
| | | | 91.5 | 3.04 | 73.3 | 3.03 |
| | | | 92.0 | 3.33 | 78.6 | 3.22 |
| | | | 93.8 | 3.12 | 81.1 | 3.64 |
| | | | 92.4 | 3.16 | 77.7 | 3.13 |

*DMAC = N,N-dimethylacetamide
**DMF - N,N-dimethylformamide

EXAMPLE 14

100% Cross-linked polybenzimidazole laminate

A solution of 7.32 g. (0.02 mole) of 4,4'-bis(o-aminoanilino)biphenyl and 3.22 g. (0.01 mole) of benzophenone tetracarboxylic dianhydride was prepared in 20 ml. of N,N-dimethylacetamide. The solution was painted (2 coats) and dried at 225° F. for 10 minutes between coats and for 30 minutes after the second coat. From this prepreg, a 7 ply laminate was prepared using the following press conditions: 500° F., 50 psi, 5 minutes. At the end of 5 minutes, the laminate was removed from the press cut into specimens, and without further cure, subjected to testing.

| Conditions | Flexural Properties | |
|---|---|---|
| | Strength, psi | Modulus, psi × 10⁶ |
| Room Temperature | 113,000 | 4.21 |
| Test at Room Temperature, after: | | |
| 20 hours at 600° F. | 104,000 | 3.91 |
| 20 hours at 700° F. | 65,000 | 3.76 |
| 20 hours at 800° F. | 64,000 | 3.54 |

What is claimed is:

1. A polybenzimidazole having a polymer chain with repeating unit represented by the following formula:

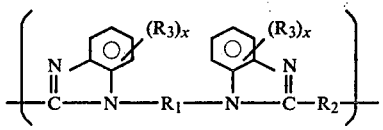

wherein $R_1$ is a divalent moiety selected from the group consisting of
(a) an arylene having from 6 to 12 carbon atoms,
(b) an alkylene having from 1 to 12 carbon atoms,
(c) a cycloalkylene having from 5 to 8 carbon atoms, inclusive,

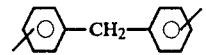 (d)

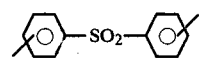 (e)

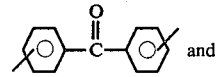 and (f)

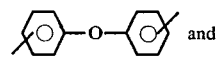 and (g)

$R_2$ is a divalent carbon ring moiety with the linkage to an adjacent repeating unit through adjacent carbon atoms of said ring, said ring moiety being selected from the group consisting of an arylene having from 6 to 12 carbon atoms and a cycloalkylene having from 5 to 8 carbon atoms, R₃ is selected from the group of lower-alkyl, lower-alkoxy, and halo, x is an integer from 0 to 4.

2. The polybenzimidazole of claim 1 in which said repeating unit is cross-linked to a repeating unit of an adjacent polymer chain through a bridge interconnecting said R₂ moieties.

3. The polybenzimidaole of claim 2 in which said bridge is formed directly between said R₂ moieties each comprising the reaction product of a dianhydride or its equivalent.

4. The polybenzimidazole of claim 1 in a partially condensed state in solution in an organic solvent.

5. The polybenzimidazole of claim 1 in the form of a film or a fiber.

6. The polybenzimidazole of claim 1 in which said R₂ ring comprises an arylene and said linkage is at the ortho position.

7. A polybenzimidazole comprising the condensation product of (a) a substituted carbon ring compound having at least one dicarboxylic anhydride or its equivalent substituted at adjacent carbon atoms, said ring compound being selected from the group consisting of an arylene having from 6 to 12 carbon atoms and a cycloalkylene having from 5 to 8 carbon atoms, and (b) an organic tetraamine of the following formula:

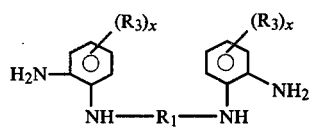

wherein R₁ is a divalent moiety selected from the group consisting of
(1) an arylene having from 6 to 12 carbon atoms,
(2) an alkylene having from 1 to 12 carbon atoms,
(3) a cycloalkylene having from 5 to 8 carbon atoms, inclusive,

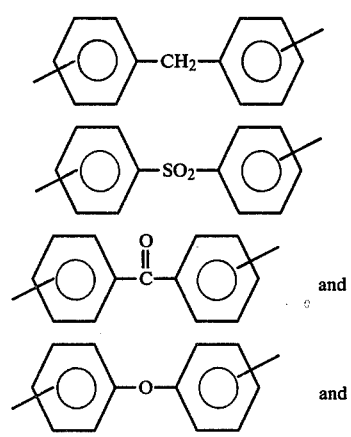

R₃ is selected from the group of lower-alkyl, lower-alkoxy, and halo, x is an integer from 0 to 4.

8. The polybenzimidazole of claim 7 in which said ring compound component comprises from 0.5 mole percent to 100 percent of a tetracarboxylic cross-linking agent.

9. The polybenzimidazole of claim 7 in a partially condensed state in solution in an organic solvent.

10. The polybenzimidazole of claim 7 in which said ring compound compound comprises phthalic anhydride.

11. A method for forming a polybenzimidazole comprising (a) mixing a substituted carbon ring compound having at least one dicarboxylic anhydride or its equivalent substituted at adjacent carbon atoms, said ring compound being selected from the group consisting of an arylene having from 6 to 12 carbon atoms and a cycloalkylene having from 5 to 8 carbon atoms, with an organic tetraamine of the following formula:

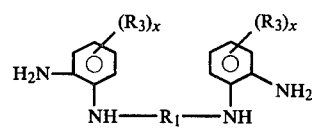

wherein R₁ is a divalent moiety selected from the group consisting of
(1) an arylene having from 6 to 12 carbon atoms,
(2) an alkylene having from 1 to 12 carbon atoms,
(3) a cycloalkylene having from 5 to 8 carbon atoms, inclusive,

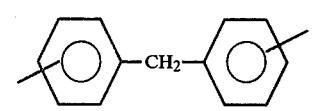

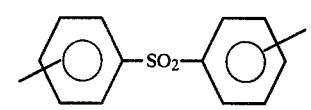

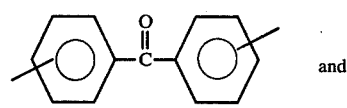
and

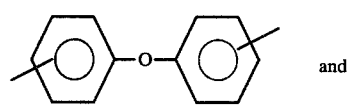
and

R₃ is selected from the group of lower-alkyl, lower-alkoxy, and halo, x is an integer from 0 to 4, to form a prepolymer mixture and (b) heating the mixture of step (a) to form a condensation polymer.

12. The method of claim 11 comprising adding a tetracarboxylic cross-linking agent to said prepolymer mixture so that said prepolymer is cross-linked during step (b).

13. The method of claim 12 in which said cross-linking agent comprises from 0.5 mole percent to 100 mole percent of said dicarboxylic acid component.

14. The method of claim 11 in which said prepolymer is dissolved in an organic solvent, coated onto a substrate, and the coated substrate is heated in step (b) to form a laminate.

* * * * *